(12) United States Patent
Hutton et al.

(10) Patent No.: US 6,620,226 B2
(45) Date of Patent: Sep. 16, 2003

(54) BUBBLE ELIMINATION TUBE WITH ACUTELY ANGLED TRANSDUCER HORN ASSEMBLY

(75) Inventors: Brenda H. Hutton, Spotswood (AU); Paul Morris, Noble Park (AU); Christoph H. Seeling, Kew (AU); David Sultana, Craigieburn (AU)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/969,073

(22) Filed: Oct. 2, 2001

(65) Prior Publication Data

US 2003/0061939 A1 Apr. 3, 2003

(51) Int. Cl.$^7$ ............................................. B01D 19/00
(52) U.S. Cl. ............................................. 96/175; 95/30
(58) Field of Search ........................... 95/30; 96/175

(56) References Cited

U.S. PATENT DOCUMENTS

| | | | |
|---|---|---|---|
| 3,151,958 A | * 10/1964 | Bodine | .......................... 95/30 |
| 3,237,384 A | * 3/1966 | Rich | .......................... 96/175 |
| 3,239,998 A | 3/1966 | Carter et al. | |
| 3,904,392 A | 9/1975 | VanIngen et al. | |
| 4,070,167 A | * 1/1978 | Barbee et al. | .......................... 96/175 |
| 4,398,925 A | 8/1983 | Trinh et al. | |
| 5,372,634 A | 12/1994 | Monahan | |
| 5,373,212 A | 12/1994 | Beau | |
| 5,508,975 A | * 4/1996 | Walter | .......................... 95/30 |
| 5,519,670 A | * 5/1996 | Walter | .......................... 367/142 |
| 5,834,625 A | 11/1998 | Kraus, Jr. et al. | |
| 5,853,456 A | 12/1998 | Bryan et al. | |
| 6,053,028 A | 4/2000 | Kraus, Jr. et al. | |
| 6,210,470 B1 | * 4/2001 | Philips et al. | .......................... 96/175 |
| 2002/0187259 A1 | * 12/2002 | Bierman | .......................... 427/208.4 |
| 2003/0002562 A1 | * 1/2003 | Yerlikaya et al. | .......................... 374/208 |
| 2003/0025383 A1 | * 2/2003 | LaCombe et al. | .......................... 301/95.101 |

FOREIGN PATENT DOCUMENTS

EP 0 631 801 A1 * 1/1995

* cited by examiner

*Primary Examiner*—Chester T. Barry
*Assistant Examiner*—Douglas J. Theisen
(74) *Attorney, Agent, or Firm*—Mark G. Bocchetti (57) ABSTRACT

A debubbling apparatus for removing gaseous bubbles entrained in a liquid is taught which has improved dearation capacity. The debubbling apparatus includes a vessel including a liquid inlet, at least one well extending from the vessel, the at least one well having a liquid outlet, and an ultrasonic transducer horn residing in the at least one well, the at least one well and the ultrasonic transducer horn residing therein being positioned at an angle in the range of from about 20° to about 45° with respect to vertical. With the ultrasonic horn and well so angled, bubbles in the liquid in the at least one well are subjected to a buoyancy force, a drag force, and an acoustic wave force which yields a resultant force that drives the bubbles toward an upper wall section of the at least one well.

11 Claims, 5 Drawing Sheets

BUBBLE ELIMINATION TUBE WITH ACUTELY ANGLED TRANSDUCER HORN ASSEMBLY

FIELD OF THE INVENTION

This invention relates generally to the removal of gaseous bubbles entrained in solution and, more particularly, to eliminating bubbles from a solution such as a photographic emulsion or dispersion using ultrasonic transducers, which create acoustic waves within the solution.

BACKGROUND OF THE INVENTION

There are a variety of emulsions, suspensions, pastes and high viscosity liquids used in a manufacture of or which become part of a variety of products in the chemical, pharmaceutical, food product, and photographic industries. These emulsions, suspensions, pastes and high viscosity liquids often contain entrained air or gases present in the form of small bubbles. Often this air or gas, particularly in the case of entrained bubbles, is detrimental to the final product being produced. For example, in the case of photographic emulsions containing bubbles, the quality of the films or photographic papers produced is greatly impaired, giving rise to coated defects making the photographic materials unusable.

The use of ultrasonics in the debubbling or deaeration of liquids is widespread. For example, U.S. Pat. No. 3,239,998 to Carter et al. uses ultrasonics to debubble multiple liquids simultaneously, while U.S. Pat. No. 5,834,625 to Kraus Jr. et al. describes removing air from a discrete sample of liquid using ultrasonics. Other, more simplistic but similar techniques employing a vessel and ultrasonic transducer(s) propose operation under a slight vacuum pressure, allowing trapped gas to be removed from a single solution. Such techniques are taught in U.S. Pat. No. 3,904,392 to Van Ingen et al., U.S. Pat. No. 4,070,167 to Barbee et al., and U.S. Pat. No. 5,372,634 to Monahan. The vacuum technique, while apparently quite popular, does not appear to assist greatly in bubble removal, and its effectiveness is significantly reduced when dealing with more viscous solutions.

An apparatus which is typically used in the photographic industry for de-bubbling photographic emulsions is an end cap round ultrasonic bubble eliminator, typically referred to as an ECR. The ECR includes a transducer for assembly (hereinafter referred to as a "THA") which is an electromechanical device which converts electrical vibration to mechanical vibration. One particular ECR with its component THA is taught in U.S. Pat. No. 5,373,212 to Beau. In the operation of an ECR, an alternating voltage is applied to a ceramic disc of the THA which, as a result, generates mechanical vibration. This mechanical vibration assists in the de-bubbling of the photographic emulsions flowing through the ECR.

U.S. Pat. No. 4,070,167 to Barbee et al. describes an apparatus with a single ultrasonic transducer placed in the vertical position beneath a horizontal tubular vessel. The apparatus has a fairly complicated recycle stage which includes a further compartment with ultrasonics, typically operated under positive pressure. This setup is quite cumbersome, and there are inherent difficulties both in operation and cleanability of the apparatus in such an arrangement.

In devices which use ultrasonics for debubbling, the acoustic forces emanating from the transducers aid in the separation of gaseous bubbles from solution, as they assist the upward buoyancy force in opposing the downward drag force of the bubbles in solution. This phenomenon has been commonly used in the debubbling of flowing solutions (e.g. U.S. Pat. No. 3,904,392 to Van Ingen et al., U.S. Pat. No. 4,070,167 to Barbee et al., U.S. Pat. No. 5,373,212 to Beau, U.S. Pat. No. 4,398,925 to Trinh et al.).

Prior art ultrasonic debubbling devices are generally unitary vessels with vertically oriented ultrasonic transducers residing in vertically oriented wells. In this manner, the flow of liquid into the vertically oriented wells is generally vertically downward against the vertically upwardly directed acoustic waves emanating from the transducer. Bubbles are carried vertically upward through the well and the main vessel. As such, the upward flow of bubbles is resisted by the downward flow of the liquid.

SUMMARY OF THE INVENTION

It is therefore an object of the present invention to provide an ultrasonic debubbling apparatus with improved debubbling capacity.

It is a further object of the present invention to provide a bubble flow path which causes the bubbles to accumulate along a well wall.

Another object of the present invention is to provide a bubble flow path which allows the discrete bubbles to coalesce to thereby enhancing bubble removal.

Yet another object of the present invention is to provide an apparatus for bubble removal where the transducer horn assembly well and, therefore, the orientation of the ultrasonic transducer may be reoriented thereby allowing the flow path of bubbles through the wells to be angled depending on the flow rate and viscosity of the liquid.

Still another object of the present invention is to provide an apparatus wherein the number of transducer horn assembly wells and the number of ultrasonic transducers is adjustable.

Briefly stated, the foregoing and numerous other features, objects and advantages of the present invention will become readily apparent upon a review of the detailed description, claims and drawings set forth herein. These features, objects and advantages are accomplished by removing bubbles from solution by passing it through a horizontal tubular vessel with ultrasonic transducers situated in wells extending beneath the main tubular vessel. The vessel is typically operated at atmospheric conditions, and the solution is set to a specific level within the vessel, creating an air/liquid interface. The number of transducers could typically be one, two or more. The wells in which the transducers reside are oriented so as to be acutely angled from vertical. Preferably, the wells in which the transducers reside are oriented at an angle in the range of from about 30° to about 45° from vertical. The optimum angle will depend on viscosity of the liquid being debubbled as well as the flow rate of the liquid. As such, the angle for any liquid being debubbled can be determined empirically. With an angled well, the buoyant force, fluid drag force, and acoustic wave force exerted on an individual bubble in the well yield a resultant force that causes the bubble to travel to the upper side wall of the well containing the transducer, where bubble accumulation takes place. The accumulated air gradually rises along the inner wall of the vessel to the air/liquid interface. As this passage of air removal has been concentrated to the walls of the vessel, it is largely unaffected by the incoming bubble containing liquid, and hence removal efficiency is greatly improved. The need for a recycle stream, as necessitated by prior art debubbling apparatus (U.S. Pat. No. 4,070,167 to Barbee et al.) is eliminated, thereby simplifying the apparatus and operation thereof significantly. In the more common arrangement of the horns situated in the vertical plane, the passage of air removal is directly opposed by the incoming bubbly fluid, creating an upper limit to the degree of deaeration possible in this configuration.

The present invention is primarily intended for removing bubbles from a flowing solution, although it is likely that discrete samples of fluid may also be treated using this invention.

DETAILED DESCRIPTION OF THE INVENTION

Figures 1, 2, 3:
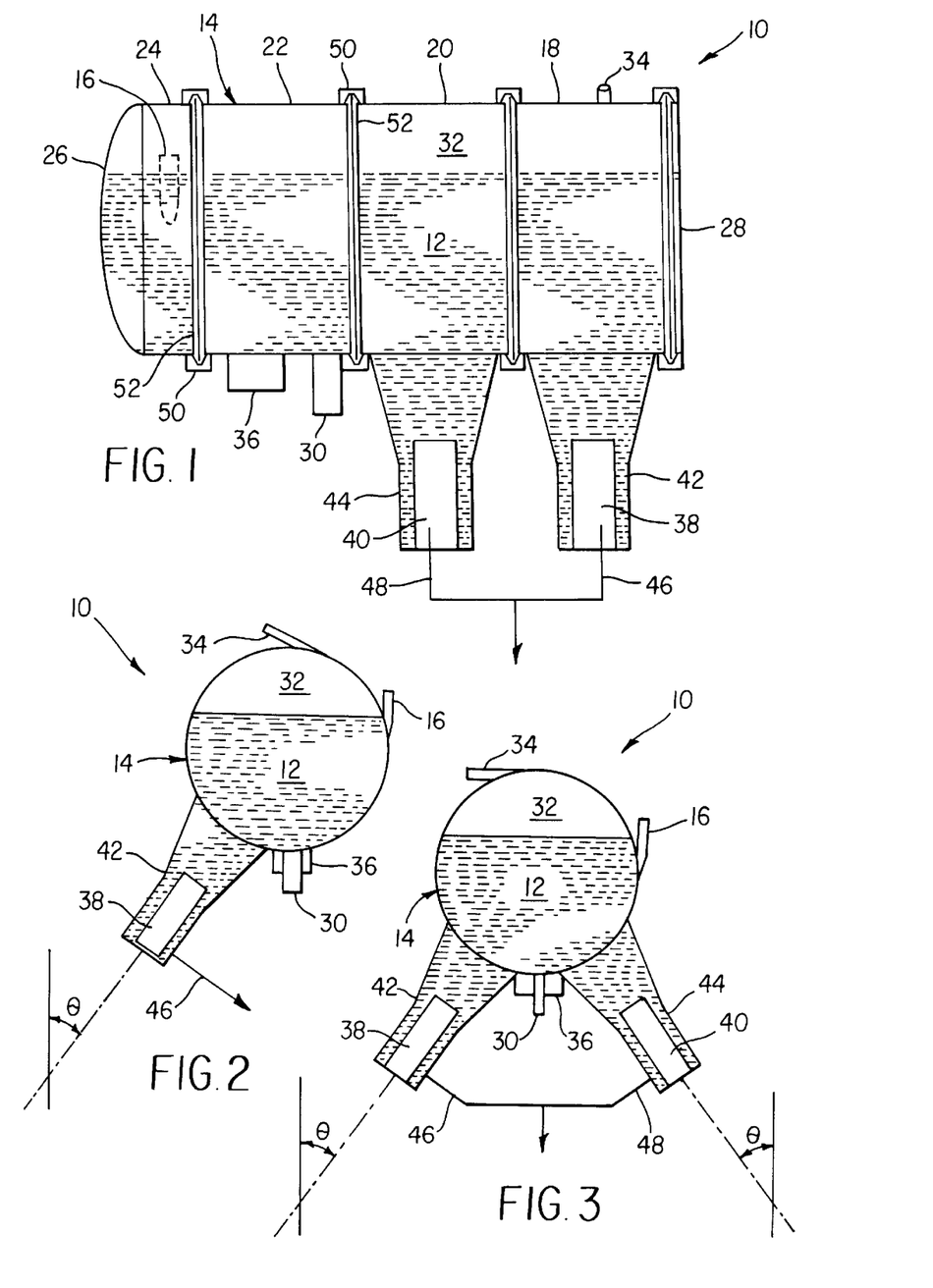
FIG. 1 is a side-view schematic of the de-bubbling apparatus of the present invention.
FIG. 2 is an end view schematic of the de-bubbling apparatus depicted in FIG. 1.
FIG. 3 is an alternative end view schematic of the de-bubbling apparatus depicted in FIG. 1 showing an alternative arrangement for the transducer wells.

Turning first to FIGS. 1 and 2 there is schematically depicted an exemplary debubbling apparatus 10 of the present invention. A liquid 12, for example, a photographic solution would be delivered from a holding tank to a horizontal tubular or drum-like vessel 14 through the inlet 16. Vessel 14 is preferably comprised of a plurality of segments 18, 20, 22, 24. Vessel 14 also includes a back plate 26 and a front plate 28. The liquid solution 12 would fill to a predetermined set level, as controlled by a pressure transducer 30 at the base of the vessel 14. The liquid solution 12 would occupy a portion of the chamber within the vessel 14 thereby defining an air space 32 within the vessel 14 above the liquid solution 12 which is preferably maintained at atmospheric pressure by means of a vent 34 open to atmosphere. There is also a drain valve 36 in at least one of the segments of vessel 14. Drainage valve 36 placed at the base of the tubular vessel prevents any accumulation of fluid during cleaning sequences and changeover to alternative solutions, thereby greatly reducing possible contamination problems.

The exemplary debubbling apparatus 10 of the present invention shown in FIGS. 1 and 2 includes two ultrasonic transducers 38, 40 situated in wells 42, 44, respectively. Each of these transducers 38, 40 is connected to a power supply (not shown) such that acoustic waves can be emitted into the liquid solution 12 in the wells 42, 44. The liquid solution 12 travels through vessel 14 down into wells 42, 44 and out exit ports 46, 48 located near the bases of wells 42, 44.

From FIG. 2, it can be seen that wells 42 and 44 (hidden by well 42, see FIG. 1) reside at angle θ with respect to vertical. If, as preferred, the vessel 14 is formed from a plurality of detachable segments then the actual angle θ at which a well 42, 44 resides can be easily adjusted. This can be accomplished merely by disconnecting the segment which includes a particular well, 42 44 extending therefrom from the remainder of vessel 14 and rotating that segment to place the well 42, 44 at the desired angle θ. As shown in FIG. 1, the individual segments may be connected to one another by clamps 50 and flanges 52. Note that by placing drain valve 36 and pressure transducer 30 in a segment separate from the segment that include wells 42, 44 drain valve 36 and pressure transducer 30 remain in their optimal vertical positions. Similarly, in the preferred segmented arrangement, it is also possible to change the tangential inlet 16 from its position shown to one where the solution 12 enters closer to the base of the vessel 14.

Looking next at FIG. 3 there is depicted an end view schematic of the apparatus 10 as shown in FIG. 1 wherein the segment including well 42 has been rotated in an opposite direction from the rotation of segment 44. Both reside at an angle θ with respect to vertical. This arrangement could be employed if solution hold-up volume becomes a critical factor that needs to be reduced, and an equivalent deaeration performance would be expected. Note that a slightly different outlet arrangement would be required to rejoin the two solution streams exiting wells 42, 44.

Figure 4:
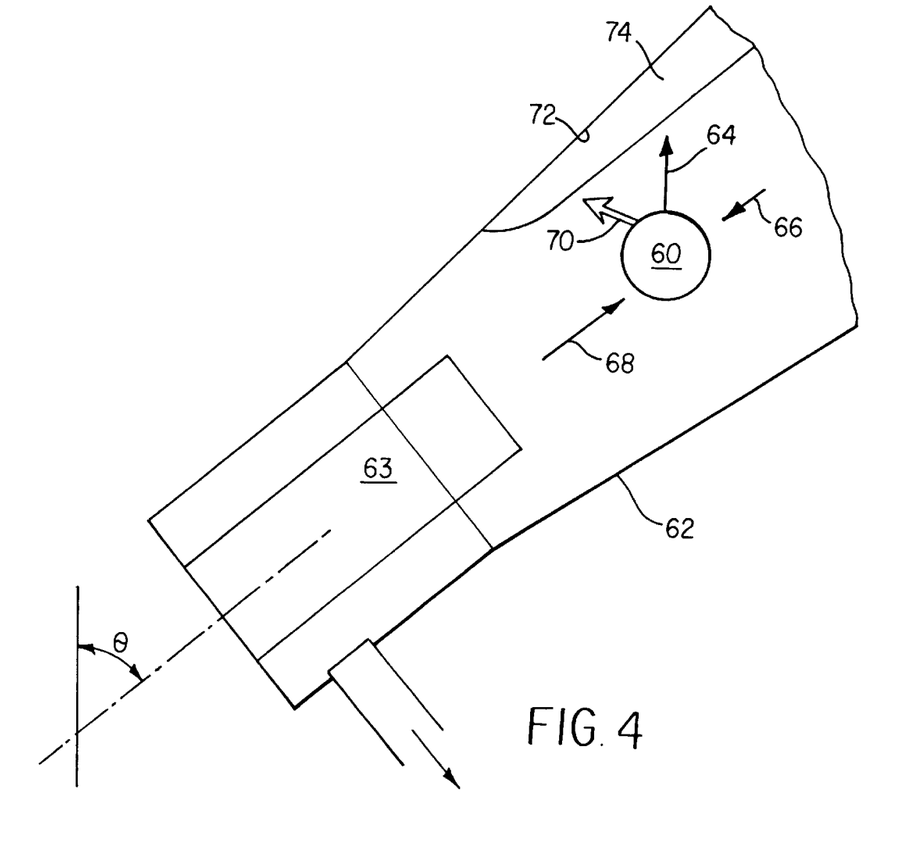
FIG. 4 is a schematic diagram of the forces present on a single bubble in solution in the well section of the de-bubbling apparatus of the present invention.

Looking next at FIG. 4 is a schematic diagram of the forces present on a single bubble 60 in a well 62 of the debubbling unit. The well 62 and transducer horn 63 are positioned at an angle θ from vertical. The buoyancy force (as indicated by arrow 64), the fluid drag force (as indicated by arrow 66) and the acoustic wave force (as indicated by arrow 68) all sum to give a resultant force (as indicated by arrow 70). Bubbles travel to the upper surface 72 of the well 62 where they accumulate to form a bubble cloud 74 along the upper surface 72 of the well 62. This bubble cloud 74 then rises to the air/liquid interface of the vessel 14 shown in FIG. 1. This rotated arrangement is responsible for significant improvements in deaeration over the prior art vertical-well arrangement.

Experiments have been conducted which demonstrate the improved debubbling capacity of the apparatus of the present invention. The data from these experiments is summarized in the graphs depicted in FIGS. 5 through 7 which plot the flow rate of the liquid being debubbled through the debubbling apparatus 10 versus downstream Bubble Detector Activity (BDA) measured as a voltage [V] signal. BDA was measured at a point downstream of the debubbling apparatus 10, after the ECR (as described in U.S. Pat. No. 5,373,212 to Beau) (not shown). Although the ECR contributed to the deaeration capacity obtained, it provided identical treatment for all cases investigated, and therefore did not alter the overall conclusions. When the system has failed in its capacity to remove bubbles, large bubbles will be detected causing the BDA voltage value to increase dramatically (greater than about 1 V) as shown in the figures. These larger bubbles are responsible for causing coating defects.

For every set of conditions tested, Bubble Detector Activity values were recorded each second for 10 minutes. In order to describe the BDA level for a given set of conditions, the 99.5 percentile, a statistical measure, was taken of the resulting data. The 0.5% of data above this BDA value is excluded from the analysis on the basis that it may be due to outside factors such as electrical noise, and not due to actual bubble activity.

Figure 5:
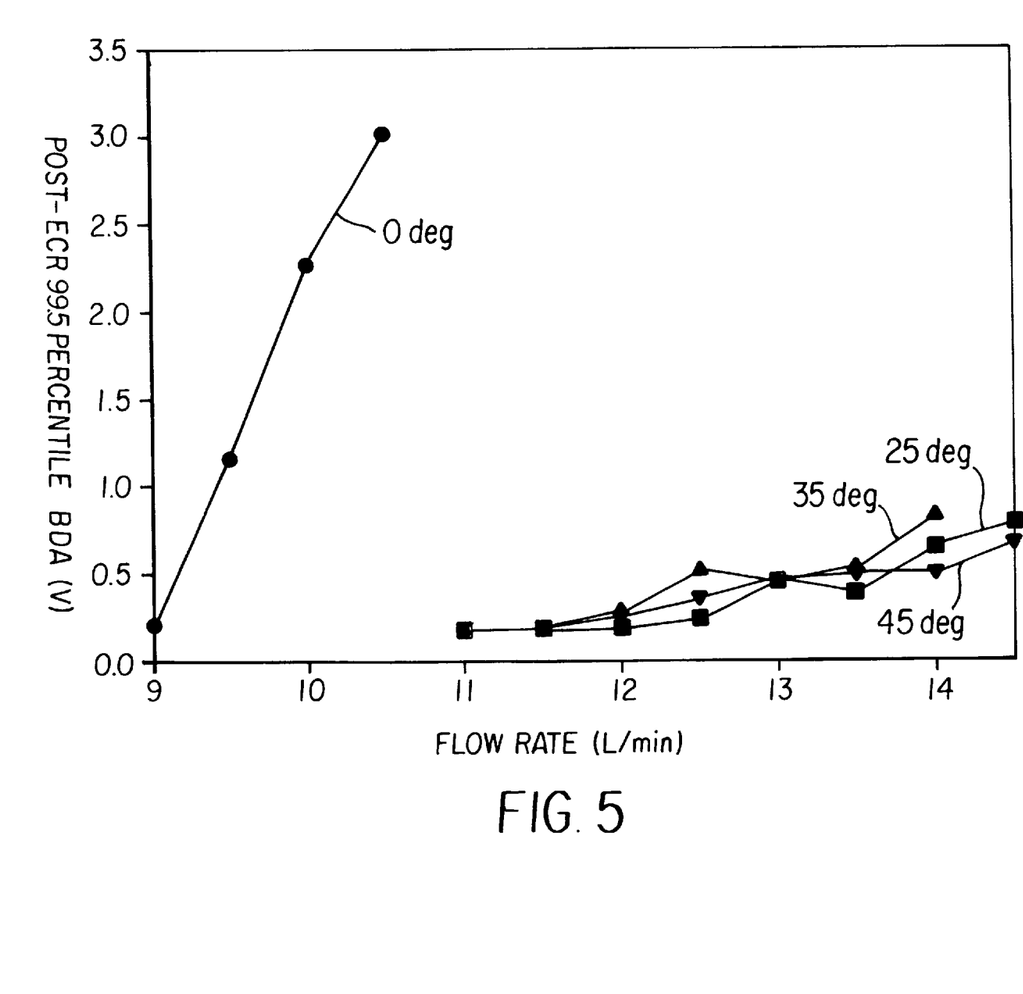
FIG. 5 is a graph plotting liquid flow rate through the debubbling apparatus versus downstream Bubble Detector Activity (BDA) measured as a voltage [V] signal for experiments conducted with a liquid having a viscosity of 100 cP and 0.30% by volume entrained air.

FIG. 5 presents the data gathered where the liquid solution being debubbled had a viscosity of 100 cP and contained 0.30% entrained air by volume. The graph plots the data for the well and horn being vertically oriented (prior art) as well as being angled at 25°, 35° and 45° from vertical. At all angles investigated, the BDA value downstream of the debubbling apparatus was reduced by 90+%, based on a comparison of the angled cases versus the prior art case. The flow rate was increased by 50% before failure of the system occurred.

Figure 6:
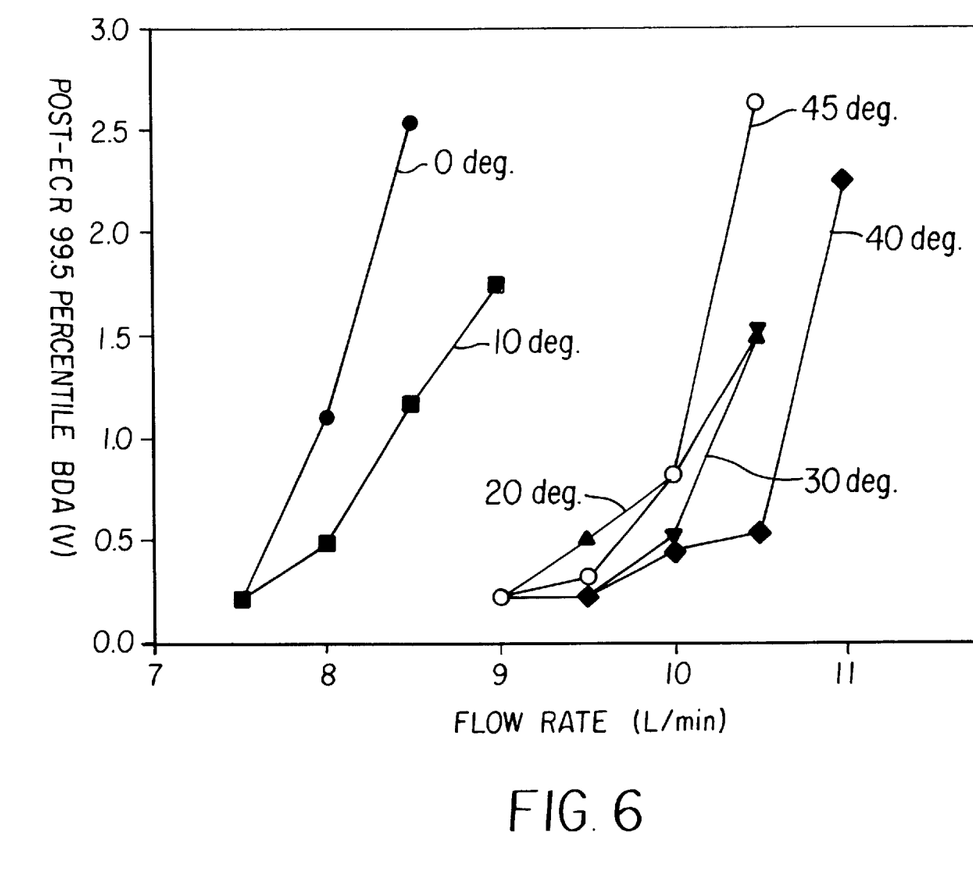
FIG. 6 is a graph plotting liquid flow rate through the debubbling apparatus versus downstream Bubble Detector Activity (BDA) measured as a voltage [V] signal for experiments conducted with a liquid having a viscosity of 150 cP and 0.30% by volume entrained air.

FIG. 6 presents the data gathered where the liquid solution being debubbled had a viscosity of 150 cP and contained 0.30% entrained air by volume. The graph plots the data for the well and horn being vertically oriented (prior art) as well as being angled at 10°, 20°, 30°, 40° and 45° from vertical. At angles of 20° and greater from vertical an average 87% reduction in BDA was demonstrated at 8.5 L/min. The flow rate was improved by approximately 30% before failure.

Figure 7:
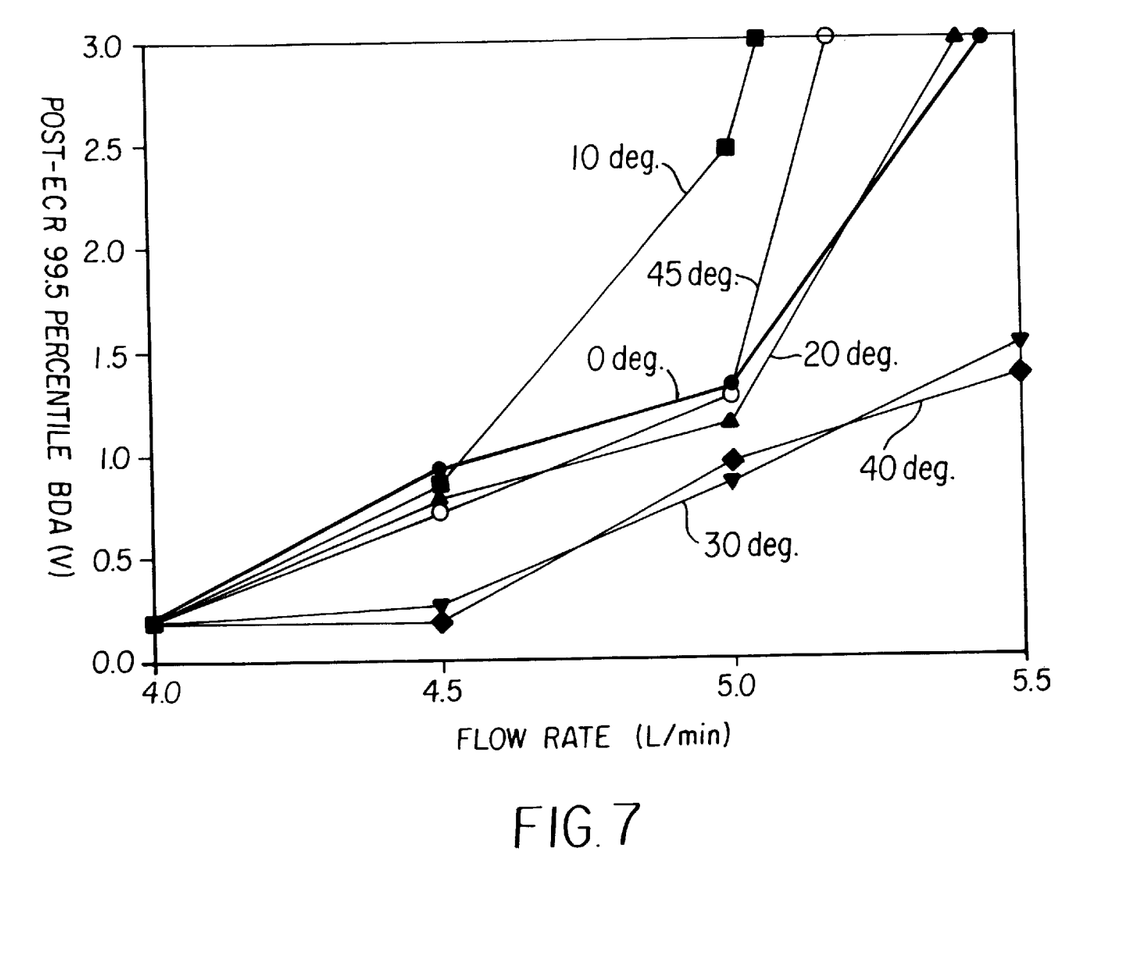
FIG. 7 is a graph plotting liquid flow rate through the debubbling apparatus versus downstream Bubble Detector Activity (BDA) measured as a voltage [V] signal for experiments conducted with a liquid having a viscosity of 300 cP and 0.30% by volume entrained air.

FIG. 7 presents the data gathered where the liquid solution being debubbled had a viscosity of 300 cP and contained 0.30% entrained air by volume. Angles were tested between vertical and 45° from vertical. Improvement was observed between 30° and 40°. An average 75% reduction in bubble activity was observed at 4.5 L/min while at 5.5 L/min, this reduction was 54%. No improvement in flow rate before failure was observed.

Based on the above experiments, there seems to be an optimal angle between about 20° and about 45° which will be suitable for solutions having viscosities in the range of from about 50 cP to about 300 cP. Preferably, for solutions having viscosities in the range of from about 50 cP to about 300 cP the well and horn should be oriented at an angle of from about 30° to about 40° from vertical, and most preferably, the well and horn should be oriented at an angle of about 35° from vertical. It should be appreciated that higher viscosities are harder to deaerate, so the improvement is expected to be less, however, the horn orientation acutely angled with respect to vertical still allows for significant improvements at particular angles. These angles can easily be determined empirically. It should also be appreciated that flow rate range and entrained air levels are also important, and effect the outcome of deaeration capacity.

From the foregoing, it will be seen that this invention is one well adapted to obtain all of the ends and objects hereinabove set forth together with other advantages which are apparent and which are inherent to the invention.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

Parts List

10 Debubbling Apparatus
12 Liquid Solution
14 Vessel
16 Inlet
18 Segment
20 Segment
22 Segment
24 Segment
26 Back Plate
28 Front Plate
30 Pressure Transducer
32 Air Space
34 Vent
36 Drain Valve
38 Ultrasonic Transducer
40 Ultrasonic Transducer
42 Well
44 Well
46 Exit Port
48 Exit Port
50 Clamps
52 Flanges
60 Bubble
62 Well
63 Transducer Horn
64 Buoyance Forge
66 Fluid Drag Forqe
68 Acoustic Wave Force
70 Resultant Force
72 Upper Surface
74 Bubble Cloud

What is claimed is:

1. A debubbling apparatus for removing gaseous bubbles entrained in a liquid comprising:

(a) vessel including a liquid inlet;
    (b) a well extending downwardly from the vessel, the well having a liquid outlet; and
    (c) an ultrasonic transducer horn residing in the well, the well and the ultrasonic transducer horn residing therein being acutely angled with respect to vertical.

2. A debubbling apparatus as recited in claim 1 wherein:
the well and the ultrasonic transducer horn residing therein are positioned at an angle such that bubbles in the liquid in the at least one well are subjected to a buoyancy force, a drag force, and an acoustic wave force which yields a resultant force that drives the bubbles toward an upper wall section of the at least one well.

3. A debubbling apparatus as recited in claim 1 wherein:
the vessel includes a front plate, a back plate and a plurality of interconnectable segments, the well extending from interconnectable segments.

4. A debubbling apparatus as recited in claim 3 wherein:
the vessel includes a front plate, a back plate and a plurality of interconnectable generally cylindrical segments, the well extending from one of the plurality of interconnectable segments.

5. A debubbling apparatus as recited in claim 4 wherein:
the plurality of interconnectable segments are interconnected by clamps such that the angle may be varied by disconnecting the clamps, and rotating a segment containing the well to a desired angle, and re-clamping the plurality of interconnectable segments together.

6. A debubbling apparatus as recited in claim 5 wherein:
there are at least two wells extending from the vessel, each of the at least two wells extending from a respective interconnectable segment, each of the at least two wells having a respective ultrasonic transducer horn residing therein.

7. A debubbling apparatus as recited in claim 6 wherein:

one of the plurality of interconnectable segments includes a drain.

8. A debubbling apparatus as recited in claim 7 wherein:

the one of the plurality of interconnectable segments that includes the drain does not include one of the at least two wells extending from the vessel.

9. A debubbling apparatus as recited in claim 7 wherein:

the number of plural interconnectable segments having wells extending therefrom may be varied to meet debubbling requirements of a particular operation.

10. A debubbling apparatus for removing gaseous bubbles entrained in a liquid comprising:

(a) a vessel including a liquid inlet;

(b) at least one well extending downwardly from the vessel, each of the at least one the well having a liquid outlet; and (c) an ultrasonic transducer horn residing in the at least one well, the at least one well and the ultrasonic transducer horn residing therein being positioned at an angle in the range of from about 20° to about 45° with respect to vertical.

11. A debubbling apparatus as recited in claim 10 wherein:

the at least one well and the ultrasonic transducer horn residing therein are positioned at an angle in the range of from about 30° to about 45° with respect to vertical.

* * * * *

UNITED STATES PATENT AND TRADEMARK OFFICE
CERTIFICATE OF CORRECTION

PATENT NO. : 6,620,226 B2  Page 1 of 1
DATED : September 16, 2003
INVENTOR(S) : Brenda H. Hutton et al.

It is certified that error appears in the above-identified patent and that said Letters Patent is hereby corrected as shown below:

Column 6,
Line 4, "claim 3" should read -- claim 2 --.

Column 7,
Line 11, "claim 7" should read -- claim 6 --.

Signed and Sealed this

Twentieth Day of April, 2004

JON W. DUDAS
*Acting Director of the United States Patent and Trademark Office*